US009402195B2

(12) United States Patent
Burley

(10) Patent No.: US 9,402,195 B2
(45) Date of Patent: Jul. 26, 2016

(54) OPERATION OF BASE STATION IN A CELLULAR COMMUNICATIONS NETWORK

(71) Applicant: CISCO TECHNOLOGY, INC., San Jose, CA (US)

(72) Inventor: Simon Burley, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/479,343

(22) Filed: Sep. 7, 2014

(65) Prior Publication Data

US 2016/0073274 A1    Mar. 10, 2016

(51) Int. Cl.
*H04W 24/00* (2009.01)
*H04W 36/00* (2009.01)
*H04W 24/02* (2009.01)
*H04W 88/08* (2009.01)

(52) U.S. Cl.
CPC .............. *H04W 24/02* (2013.01); *H04W 88/08* (2013.01)

(58) Field of Classification Search
CPC ... H04W 48/08; H04W 84/045; H04W 24/02; H04W 16/32; H04W 36/0061; H04W 36/0094; H04W 36/14; H04W 48/16; H04W 8/00; H04W 8/005; H04W 92/02; H04W 36/18; H04W 76/064; H04J 11/0093; H04L 12/2854
USPC ........... 455/436, 422.1, 418, 433, 434, 435.1, 455/438, 442, 444, 445, 437, 439, 456.1; 370/338, 319, 332, 333, 334
See application file for complete search history.

(56) References Cited

U.S. PATENT DOCUMENTS

| 6,141,565 | A  | 10/2000 | Feuerstein et al. |
| 6,771,934 | B2 | 8/2004  | Demers |
| 7,151,937 | B2 | 12/2006 | Jin et al. |
| 7,379,739 | B2 | 5/2008  | Rajkotia et al. |
| 7,884,763 | B2 | 2/2011  | Na et al. |
| 7,974,652 | B2 | 7/2011  | Gerlach |

(Continued)

FOREIGN PATENT DOCUMENTS

| CN | 104684052 A | 6/2015 |
| EP | 1322048     | 6/2003 |

(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

(Continued)

*Primary Examiner* — Inder Mehra
(74) *Attorney, Agent, or Firm* — Patent Capital Group

(57) ABSTRACT

In one embodiment, a method of forming a neighbor cell list in a base station of a cellular communications network comprises, at periodic intervals, and for specified durations: requesting the or each wireless device that is in connected mode with the base station to report a unique identifier for each other base station that it is able to detect; receiving reports from the or each wireless device that is in connected mode with the base station; and operating with a neighbor cell list compiled on the basis of the received reports.

20 Claims, 4 Drawing Sheets

(56) References Cited

U.S. PATENT DOCUMENTS

| | | |
|---|---|---|
| 7,983,667 B2 | 7/2011 | Hart et al. |
| 8,045,996 B2 | 10/2011 | Brunner et al. |
| 8,107,950 B2 | 1/2012 | Amirijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2* | 9/2012 | Vikberg ............ H04L 12/2854 370/328 |
| 8,320,965 B2 | 11/2012 | Kwun |
| 8,340,711 B1 | 12/2012 | Glass et al. |
| 8,400,921 B2 | 3/2013 | Grayson et al. |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 2005/0215251 A1 | 9/2005 | Krishnan |
| 2005/0282572 A1 | 12/2005 | Wigard et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2010/0009634 A1 | 1/2010 | Budianu |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1* | 12/2010 | Gerstenberger ........ H04W 8/26 455/443 |
| 2011/0039539 A1 | 2/2011 | Wada et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0151877 A1* | 6/2011 | Tafreshi ................ H04W 36/18 455/442 |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0201277 A1 | 8/2011 | Eguchi |
| 2011/0211514 A1 | 9/2011 | Hamalainen |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marsico |
| 2012/0129537 A1 | 5/2012 | Liu et al. |
| 2012/0176980 A1 | 7/2012 | Moon et al. |
| 2012/0178451 A1* | 7/2012 | Kubota ................... H04W 8/00 455/436 |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1* | 6/2013 | Prakash ................ H04W 16/14 370/328 |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1* | 1/2014 | Frenger ............... H04J 11/0093 455/434 |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1* | 3/2014 | Brisebois ............. H04W 24/02 455/418 |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca |

(56) References Cited

U.S. PATENT DOCUMENTS

| | | |
|---|---|---|
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0063223 A1 | 3/2015 | Shen |
| 2015/0063231 A1 | 3/2015 | Seo et al. |
| 2015/0138981 A1 | 5/2015 | Nuss et al. |
| 2015/0146594 A1 | 5/2015 | Grayson et al. |
| 2015/0148036 A1 | 5/2015 | Grayson et al. |
| 2015/0256314 A1 | 9/2015 | Gauvreau et al. |
| 2015/0351072 A1 | 12/2015 | Okmyanskiy et al. |

FOREIGN PATENT DOCUMENTS

| | | |
|---|---|---|
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014, 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010, See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

ETSI TS 123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-FRANCE, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].

ETSI TS 125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.

ETSI TS 125 469 v11.2.0, "Universal Mobile Telecommunications System (UMTS); UTRAN Iuh interface Home Node B (HNB); Application Part (HNBAP) signalling (3GPP TS25.469 version

(56) References Cited

OTHER PUBLICATIONS 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0

(56) References Cited

OTHER PUBLICATIONS

Release 8);" ETSI, European Telecommunications Standards Institute 2012, 650 Route des Lucioles, F06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles-Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

(56) References Cited

OTHER PUBLICATIONS

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network (9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F06921 Sophia-Antipolis Cedex; France; Sep. 2012, 205 pages.

"3GPP TS 36.413 V9.5.1 (Jan. 2011) Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.

3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.

Basir, Adnan, "3GPP Long Term Evolution (LTE), ICIC and eICIC," posted Jun. 11, 2012; 5 pages; http://4g-lte-world-blogspot.com/2012/06/icic-and-eicic.html.

Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.

"Broadband Forum Technical Report: TR-069 CPE WAN Management Protocol," Issue: 1, Amendment 4, Issue Date: Jul. 2011 Protocol Version 1.3; ©The Broadband Forum; 190 pages.

"Broadband Forum Technical Report: TR-069 CPE WAN Management Protocol," Issue: 1, Amendment 5, Issue Date: Nov. 2013 CWMP Version 1.4; ©The Broadband Forum; 228 pages.

"Broadband Forum Technical Report: TR-196 Frmto Access Point Service Data Model," Issue: 2, Issue Date: Nov. 2011; 46 pages.

Calhoun, P. "Diameter Base Protocol," Network Working Group RFC 3488, Sep. 2003; 147 pages.

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.

"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

(56) References Cited

OTHER PUBLICATIONS

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Cisco's One Platform Kit (onePK)," Networking Software (IOS & NX-OS), Cisco Systems, Inc., First published on or about Mar. 3, 2014; 2 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.

Droms, R., "Dynamic Host Configuration Protocol," Network Working Group RFC 2131, Mar. 1997; 45 pages.

"E Band," from Wikipedia, the free encyclopedia, Dec. 24, 2013; 3 pages.

"EEM Configuration for Cisco Integrated Services Router Platforms," Configuration Guide for Cisco IOS® Embedded Event Manager (EEM), Cisco Systems, Inc., Feb. 2008; 17 pages.

"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.

Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.

Ericsson, et al., "LPN Range Expansion in Co-Channel Deployment in Heterogeneous Networks," 3GPP Draft R1-125219 3rd Generation Partnership Project (3GPP), Mobile Competence Centre; 650; Route Des Lucioles; F-06921 Sophia-Antipolis; Nov. 2012, 7pages.

Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages.

"Fading," from Wikipedia, the free encyclopedia, Apr. 10, 2015; 6 pages.

"Frame Structure—Downlink," Share Technote, first published on or about Jul. 9, 2012; 13 pages http://www.sharetechnote.com/html/FrameStructure_DL.html.

"Fuzzy Logic," from Wikipedia, the free encyclopedia, Dec. 3, 2015; 12 pages.

Freescale Semiconductor, "Long Term Evolution Protocol Overview," White Paper, Document No. LTEPTCLOVWWP, Oct. 2008; 21 pages.

Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.

Goldsmith, A.J., et al., "Variable Rate Variable-Power MQAM for Fading Channels," IEEE Trans. On Comm. vol. 45, No. 10, Oct. 1997.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto, University of OULU, Department of Computer Science and Engineering; Oct. 2013, 66 pages.

Holbrook, H., et al., "Source-Specific-Multicast for IP," Network Working Group RFC 4607, Aug. 2006.

Horn, Gavin, "3GPP Femtocells: Architecture and Protocols," Qualcomm Incorporated, 5775 Morehouse Drive, San Diego, CA, Sep. 2010; 64 pages.

"Hysteresis," from Wikipedia, the free encyclopedia; Oct. 1, 2015.

"Hybrid Automatic Repeat Request," from Wikipedia, the free encyclopedia, Jun. 8, 2015; 4 pages.

Ku, Gwanmo, "Resource Allocation in LTE," Adaptive Signal Processing and Information Theory Research Group, Nov. 11, 2011; 33 pages.

Kwan, R., et al., "A Survey of Scheduling and Interference Mitiation in LTE," vol. 2010, Article ID 273486, May 30, 2010.

Kwan, R., et al., "On Radio Admission Control for LTE Systems," Proc. Of IEEE VTC-fail, Sep. 6-9, 2010.

La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.

Leung, K., et al., "WiMAX Forum/3GPP2 Proxy Mobile IPv4," Independent Submission RFC 5563, Feb. 2010; 41 pages.

Lopez-Perez, D., et al., "Interference Avoidance and Dynamic Frequency Planning for WiMAX Femtocells Networks," Proceedings of ICCS, Jun. 23-25, 2008.

LteWorld, "Packet Data Convergence Protocol (PDCP)," Information Page, LteWorld.org, published on or about Jan. 2, 2013; 2 pages.

"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.

"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.

"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.

"LTE Layers Data Flow," LTE Tutorial, tutorialspoint; first published on or about Jan. 17, 2013; 3 pages http://www.tutorialspoint.com/lte/lte_layers_data_flow.htm.

"LTE Protocol Stack Layers," LTE Tutorial, tutorialspoint; first published on or about Jan. 16, 2013 http://www.tutorialspoint.com/lte/lte_protocol_stack_layers.htm.

"LTE Quick Reference," from Share Technote; first published on or about Nov. 28, 2012 http://www.sharetechnote.com/html/Handbook_LTE_RNTI.html.

"LTE Quick Reference: CCE Index Calculation," LTE Handbook, Share Technote, first published on or about Jul. 8, 2012 http://www.sharetechnote.com/html/Handbook_LTE_CCE_Index.html.

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.

"LTE TDD Overview," from ShareTechnote; first published on or about Jul. 2, 2014 http://www.sharetechnote.com/html/LTE_TDD_Overview.html.

Madan, Ritesh, et al., "Fast Algorithms for Resource Allocation in Wireless Cellular Networks," IEEE/ACM Transactions on Networking, vol. 18, No. 3, Jun. 2010; 12 pages.

Mehlfuhrer, M., et al., "Simulating the Long Term Evolution Physical Layer," Proc. Of 17th European Signal Processing Conference (EUSIPCO), Aug. 24-28, 2009.

Narten T., et al., "Neighbor Discovery for IP version 6 (IPv6)," Network Working Group RFC 4861, Sep. 2007; 97 pages.

NGMN Alliance, "Further Study on Critical C-RAN Technologies," Next Generation Mobile Networks, Mar. 31, 2015; 93 pages.

Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.

(56) References Cited

OTHER PUBLICATIONS

Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"plane (in networking)," Definition from WhatIs.com; Jan. 2013 http://whatis.techtarget.com/definition/plane-in-networking.
Piro, G. et al., "An LTE module for the ns-3 Network Simulator," in Proc. Of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. Of IEEE GLOBECOM, Dec. 2004, Dallas (USA).
Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-1565.
Stolyar A.L., et al., "Self-Organizing Dynamic Fractional Frequency Reuse for Best-Effort Traffic through Distributed Inter-Cell Coordination," IEEE Infocom 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.
"Transmission Time Interval," from Wikipedia, the free encyclopedia, May 2, 2013.
PCT—Feb. 13, 2013 International Search Report and Written Opinion from International Application PCT/GB2012/052511; 28 pages.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document Number: 3GPPEVOLUTIONWP; Jul. 2007; 27 pages.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Mar. 26, 2015 Extended Search Report and Opinion from European Application Serial No. EP14190541.
PCT Mar. 17, 2014 International Search Report and Written Opinion from International Application Serial No. PCT/IL2013/000086, 12 pages.

(56) References Cited

OTHER PUBLICATIONS

PCT Jun. 16, 2014 International Search Report and Written Opinion of the International Searching Authority for International Application Serial No. PCT/IL2013/000085.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
U.S. Appl. No. 14/845,995 filed Sep. 4, 2015, entitled "Method and System for Dynamic Allocation of Resources in a Cellular Network," Inventors: Vladimir Yanover, et al.
U.S. Appl. No. 14/479,343 filed Sep. 7, 2014, entitled "Operation of Base Station in a Cellular Communications Network, " Inventor: Simon Burley.
U.S. Appl. No. 14/818,084 filed on Aug. 4, 2015 entitled "Resource Adaptation for Frequency Domain Downlink Inter-Cell Interference Coordination," Inventors: Ritesh K. Madan et al.
U.S. Appl. No. 14/848,026 filed on Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580 filed on Jul. 28, 2015 entitled "Determining Fractional Frequency Reuse Power Levels for Downlink Transmissions," Inventor: Ritesh K. Madan.
U.S. Appl. No. 14/816,957 filed on Aug. 3, 2015 entitled "Selecting Cells for Downlink Inter-Cell Interference Coordination," Inventors: Rohit U. Nabar et al.
U.S. Appl. No. 14/816,990 filed on Aug. 3, 2015 entitled "User Equipment Power Level Selection for Downlink Transmissions," Inventors: Vikram Chandrasekhar et al.
U.S. Appl. No. 14/679,868 filed Apr. 6, 2015, entitled "System and Method for Managing Interference in a Network Environment Based on User Presence," Inventors: Mark Grayson, et al.
U.S. Appl. No. 14/687,198 filed Apr. 15, 2015, entitled "System and Method for Managing Interference in a Network Environment Based on User Presence," Inventors: Mark Grayson, et al.
U.S. Appl. No. 14/686,598 filed Apr. 14, 2015, entitled "System and Method for Providing Uplink Inter Cell Interference Coordination in a Network Environment," Inventors: Ritesh K. Madan, et al.
U.S. Appl. No. 14/691,260 filed Apr. 20, 2015, entitled "System and Method for Providing Uplink Inter Cell Interference Coordination in a Network Environment," Inventors: Ritesh K. Madan, et al.
U.S. Appl. No. 14/809,201 filed Jul. 25, 2015, entitled "System and Method to Facilitate Small Cell Uplink Power Control in a Network Environment," Inventors: Ritesh K. Madan, et al.
U.S. Appl. No. 14/833,519 filed Aug. 24, 2015, entitled "System and Method to Facilitate Small Cell Uplink Powercontrol in a Network Environment," Inventors: Ritesh K. Madan, et al.
U.S. Appl. No. 14/918,420 filed Oct. 20, 2015, entitled "System and Method for Frequency and Time Domain Downlink Inter-Cell Interference Coordination," Inventors: Ritesh K. Madan, et al.
U.S. Appl. No. 14/951,987 filed Nov. 25, 2015, entitled "System and Method for Frequency and Time Domain Downlink Inter-Cell Interference Coordination," Inventors: Ritesh K. Madan, et al.
U.S. Appl. No. 14/803,475 filed Jul. 20, 2015, entitled "System and Method for Decoupling Long Term Evolution Media Access Control Scheduling From Subframe Rate Procedures," Inventors: Oliver James Bull et al.
U.S. Appl. No. 14/961,552 filed Dec. 7, 2015, entitled "System and Method to Provide Uplink Interference Coordination in a Network Environment," Inventor: Ritesh K. Madan.
U.S. Appl. No. 14/993,859 filed Jan. 12, 2016, entitled "System and Method to Facilitate Centralized Radio Resource Management in a Split Radio Access Network Environment," Inventor: Ritesh K. Madan.
U.S. Appl. No. 15/002,187 filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844 filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677 filed Feb. 8, 2016, entitled "Mitigation of Uplink Interference Within Heterogeneous Wireless Communications Networks," Inventor: Pankaj Uplenchwar, et al.

\* cited by examiner

US 9,402,195 B2

OPERATION OF BASE STATION IN A CELLULAR COMMUNICATIONS NETWORK

TECHNICAL FIELD

The present disclosure relates generally to the operation of a base station in a cellular communications network.

BACKGROUND

In certain cellular communications networks, the network operator allocates a pool of cell identifiers, and each base station uses one of these identifiers in its transmissions. The number of available identifiers is less than the number of base stations, and so the identifier used by a base station will probably also be used by other base stations. Steps can therefore be taken to ensure that the identifier used by a base station will not also be used by other nearby base stations.

Each base station also compiles a list of its neighboring cells, to be used when a mobile device is preparing a handover from one cell to another. The presence of multiple nearby base stations using the same cell identifier means that it is not always possible for the base station to compile a neighbor cell list that accurately reflects the state of the network. A neighbor cell list may be complied based on measurement reports received from a wireless device, with the measurement reports containing information about particular base stations. The presence of two base stations using the same cell identifier may then mean that the received information is associated with the wrong base station.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

There is described in one example embodiment a method of forming a neighbor cell list in a base station of a cellular communications network. The method comprises, at periodic intervals, and for specified durations, requesting at least one wireless device that is in connected mode with the base station to report a unique identifier for each other base station that it is able to detect. Reports are received reports from the or each wireless device that is in connected mode with the base station, and the base station operates with a neighbor cell list compiled on the basis of the received reports.

In more particular embodiments, the method comprises creating the neighbor cell list on the basis of the received reports. In other embodiments, the method comprises forwarding information from the received reports to a core network node of the cellular communications network; and receiving the neighbor cell list complied on the basis of the received reports from the core network node. The periodic intervals and the specified durations may each be separately configurable.

The method may further comprise reconsidering an identifier used by the base station itself in response to the received reports, such that the identifier used by the base station is not in use by another base station meeting a proximity condition. The method may further comprise, in certain embodiments, reporting to a core network node of the cellular communications network instances where one of the wireless devices in connected mode reports that it can detect signals from another base station that is using a same physical cell identifier as said base station. The method may also comprise, in certain embodiment, reporting to a core network node of the cellular communications network instances where one or more of the wireless devices in connected mode reports that it can detect signals from two other base stations that are using a same physical cell identifier as each other, but have different unique identifiers.

In another example embodiment, there is provided a base station for a cellular communications network, comprising: a processor; and a memory, said memory containing instructions executable by the processor. The base station is operative to:

at periodic intervals, and for specified durations, request at least one wireless device that is in connected mode with the base station to report a unique identifier for each other base station that it is able to detect; receive reports from the or each wireless device that is in connected mode with the base station; and operate with a neighbor cell list compiled on the basis of the received reports.

EXAMPLE EMBODIMENTS

Figure 1:
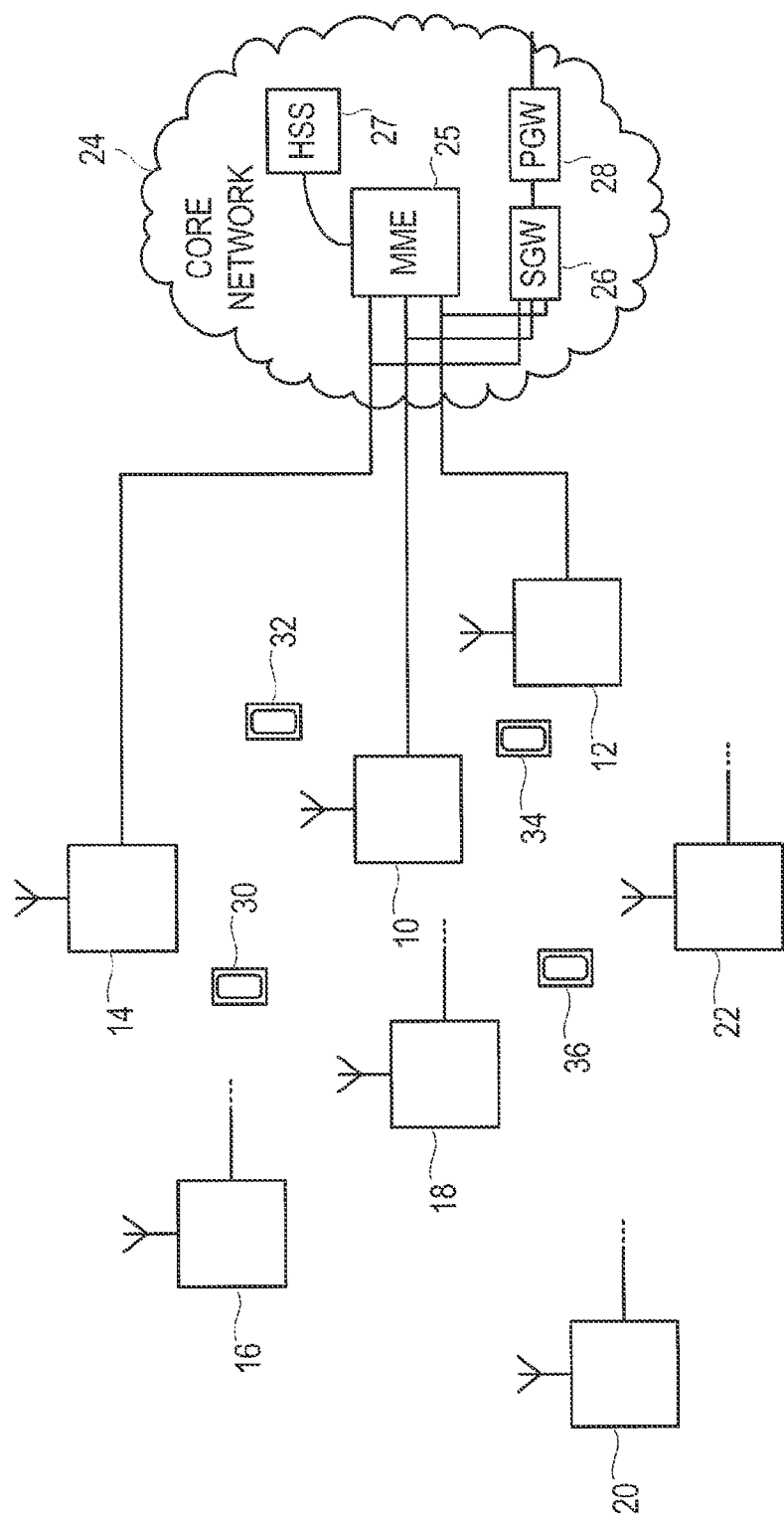
FIG. 1 is a schematic illustration of a cellular communications network in accordance with an embodiment.

FIG. 1 illustrates a part of a cellular communications network, comprising multiple base stations 10, 12, 14, 16, 18, 20, 22. Each of these base stations has a connection to a core network 24 of the cellular communications network. The connections between the base stations 10, 12, 14, 16, 18, 20, 22 and the core network 24 may be wired, or wireless, or a mixture of wired and wireless connections. It will be appreciated that a typical cellular communications network will include many more base stations than are shown here, but FIG. 1 shows enough of the network for an understanding of the present method.

The cellular communications network may use any communications technology. In one embodiment, the cellular communications network operates using the Long Term Evolution (LTE) technology, and this description will relate to that specific network technology, but the methods described herein can be used in any suitable network.

In an LTE network, the radio access network is referred to as the Evolved UMTS Terrestrial Radio Access Network (EUTRAN), and the base stations 10, 12, 14, 16, 18, 20, 22 are commonly referred to as eNodeB's. The core network 24 includes multiple modes, performing respective standardized functions. For an understanding of the present method, it is sufficient to note that, in the case of the LTE cellular communications network, the core network 24 takes the form of the Evolved Packet Core (EPC), and includes a Mobility Management Entity (MME) node 25, which has multiple functions.

The MME node 25 is responsible for idle mode User Equipment (UE) paging, and is involved in the bearer activation/deactivation process and is also responsible for choosing the Serving Gateway (SGW) 26 for a UE at the initial attach and at time of intra-LTE handover involving Core Network (CN) node relocation. The MME node 25 is also responsible (together with the Home Subscriber Server 27) for authenticating the user. Thus, the MME node 25 checks the authorization of the UE to camp on the service provider's Public Land Mobile Network (PLMN) and enforces UE roaming restrictions. The MME node 25 is the termination point in the network for ciphering/integrity protection and handles the security key management.

The Serving Gateway (SGW) 26 routes and forwards user data packets, while also acting as the mobility anchor for the user plane during inter-eNodeB handovers and as the anchor for mobility between LTE and other 3GPP technologies. For idle state UEs, the SGW terminates the downlink data path and triggers paging when downlink data arrives for the UE.

The Home Subscriber Server 27 is a central database that contains user-related and subscription-related information. The HSS 27 is thus involved in mobility management, call and session establishment support, user authentication and access authorization.

A Packet Data Network (PDN) Gateway (PGW) 28 provides connectivity from the UE to external packet data networks. A UE may have simultaneous connectivity with more than one PGW for accessing multiple PDNs. The PGW performs functions such as policy enforcement, packet filtering for each user, and charging support.

Each eNodeB 10, 12, 14, 16, 18, 20, 22 connects over a S1-AP protocol interface with the MME node 25, and connects over the GTP-U interface with the respective SGW node 26.

In addition, each eNodeB 10, 12, 14, 16, 18, 20, 22 can connect to other eNodeB's over a respective X2 interface.

Each base station provides coverage for devices in its coverage area, or cell. In a typical cellular communications network, there are macrocells that have a relatively large coverage area, with the macrocells together providing coverage across the whole of the area served by the network. In addition, there are smaller cells, which provide additional coverage in parts of the area served by the network, where the demand requires this additional capacity. For example, the smaller cells may be provided in urban areas, within different parts of a building, etc. In this illustrated embodiment, the base stations 10, 12, 14, 16, 18, 20, 22 are small cell base stations, although the methods described herein may be used in any base stations where required. In addition, although this description relates to an embodiment in which the method relates to a licensed radio small cell, the methods described can be applied at any radio access point that has a cell identifier in a configurable network as described here.

In addition, although the method is described herein with reference to an example in which each base station provides coverage for a single cell, the method is also applicable to examples in which one or more of the base stations in the radio access network serves more than one cell.

FIG. 1 shows four wireless devices 30, 32, 34, 36, which are in the cell served by the base station 10. It will be appreciated that a typical cellular communications network will include many more wireless devices than are shown here, but FIG. 1 shows enough of the network for an understanding of the present method.

The wireless devices 30, 32, 34, 36 may be of any type suitable for bidirectional communication with the cellular communications network. For example, the devices may be mobile phones, smartphones, portable computers or the like, that are intended to be operated by a user while moving, or may be devices such as wireless routers that are intended to operate from a generally fixed location, or may be devices such as tracking devices, or devices using Machine-Type Communications (MTC) that are intended to operate without direct human intervention while moving or stationary. In a typical network, most of the wireless devices are user equipment devices (UEs), and that term is also used in the following description to describe a traditional user equipment device, or any other device, component, element, endpoint, or object capable of initiating or receiving voice, audio, video, media, or data exchanges within the communication system.

Figure 2:
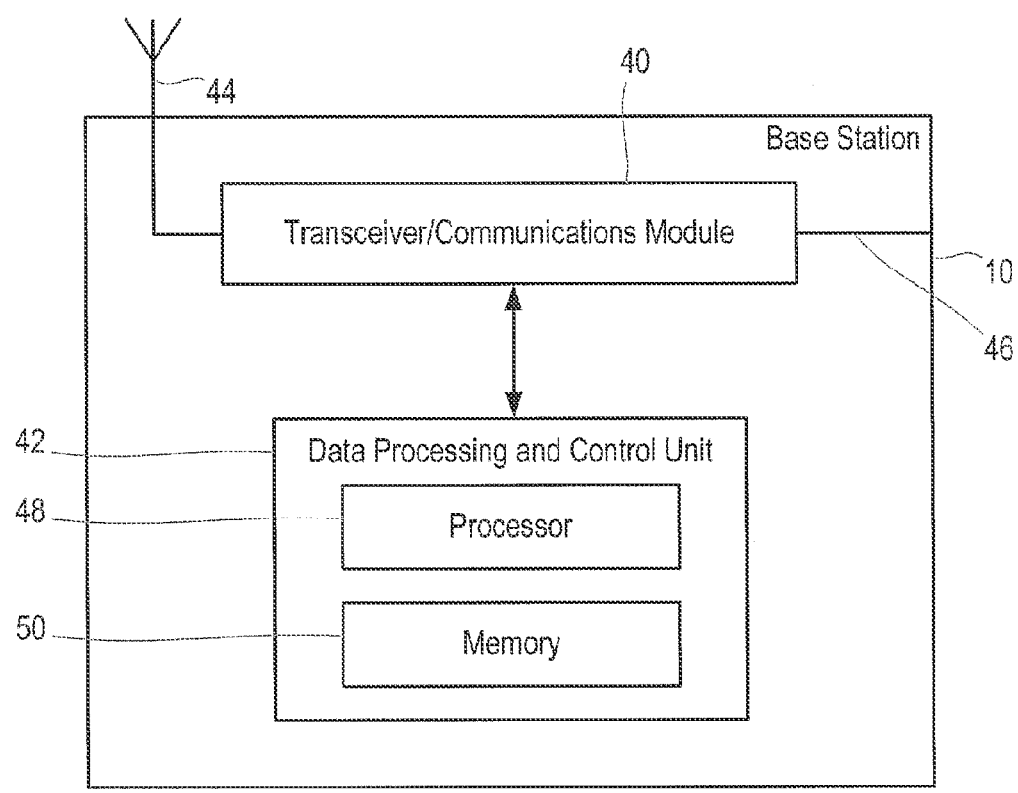
FIG. 2 is a schematic illustration of a base station in the cellular communications network of FIG. 1.

FIG. 2 illustrates the general form of a base station in the cellular communications network, in this case the base station 10, although the other base stations may have generally the same form. Specifically, the base station 10 includes a transceiver/communications module 40 and a data processing and control unit 42.

The transceiver/communications module 40 is able to provide the required communications over the radio interface in the cellular communications network through a connection to an antenna 44. Thus, in this illustrated case of an LTE eNodeB, the communications over the radio interface use the Evolved UMTS Terrestrial Radio Access (E-UTRA) protocols. In this illustrated embodiment, the transceiver/communications module 40 is able to communicate over system downlink channels with user equipment devices that are present in the network, and is able to receive signals that are transmitted by the user equipment devices over system uplink channels.

It is known that some base stations are additionally able to detect signals transmitted by other base stations, and are thus able to receive and decode signals that are transmitted on system downlink channels. However, this capability typically requires additional hardware, for example in the form of radio receiver circuitry, in the base station. In this example embodiment, the base station 10 does not have the ability to detect signals on system downlink channels, and therefore relies on reports received from the connected user equipment devices in order to obtain information about the network configuration.

The transceiver/communications module 40 is also connected via a connection 46 to the core network 24 of the cellular communications network. The S1-AP protocol interface used for communications with the MME node 25, and the GTP-U interface used for communications with the respective SGW node 26 are together known as the S1 interface. As mentioned above, the communications between the base station 10 and the core network 24 can take place over a wired or wireless link, using any suitable technique.

More generally, the transceiver/communications module 40 includes network elements for receiving, transmitting, and/or otherwise communicating data or information in a network environment.

The data processing and control unit 42 includes at least one processor 48, and at least one memory 50, and the memory 50 stores a program, containing instructions for causing the processor to perform various processes, including those described herein.

The processor 48 may be a single device or may include multiple devices operating together, in order to execute any type of instructions associated with the data to achieve the operations detailed herein. The processor 48 may operate with fixed logic or programmable logic (e.g., software/computer instructions executed by the processor) and the elements identified herein could be a programmable processor, programmable digital logic (e.g., a field programmable gate array [FPGA], an erasable programmable read only memory (EPROM), an electrically erasable programmable ROM (EE- PROM)) or an ASIC that includes digital logic, software, code, electronic instructions, or any suitable combination thereof.

The memory 50 may similarly be provided as a single device, or as multiple devices operating together for storing information to be used in performing the activities described herein. The memory 50 may take the form of, or may include, Random Access Memory (RAM), Read Only Memory (ROM), Electrically Erasable Programmable Read Only Memory (EEPROM), Flash memory, etc., in a fixed or removable component, device, element, or object.

Figure 3:
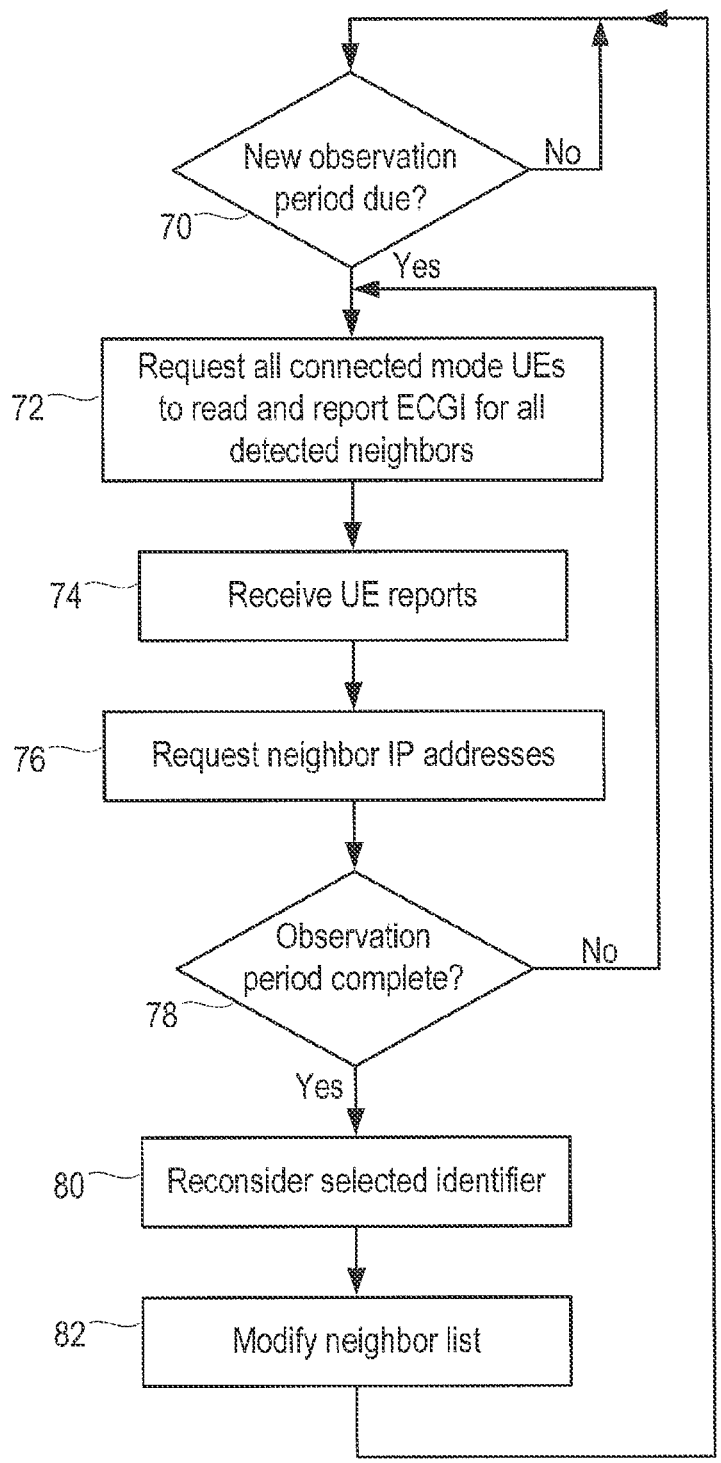
FIG. 3 is a flow chart, illustrating a method in accordance with one embodiment.

FIG. 3 illustrates a first process performed in the base station 10, in accordance with an embodiment of the disclosure.

It is important to note that the steps shown in FIG. 3 illustrate one example of a process. Some of these steps may be deleted or removed where appropriate, or these steps may be modified or changed considerably without departing from the scope of the present disclosure. In addition, while the operations are described as being sequential, they may be executed concurrently with, or in parallel to, one or more additional operations.

The process shown in FIG. 3 starts at step 70, at a time when the base station 10 is in operation in the cellular communications network. At this time, the base station 10 is operating with a physical layer identifier that it broadcasts with its transmissions. In the illustrative embodiment described here, in which the cellular communications network is an LTE network, the identifier is a Physical Cell Identity (PCI). In the case in which the cellular communications network is a Universal Mobile Telecommunications System (UMTS) network, the identifier may be a Primary Scrambling Code (PSC). In either case, the number of available identifiers is considerably smaller than the number of base stations expected to be present in the network. Therefore, the process of installation of the base station 10 will typically include a process for selecting an identifier that minimizes the likelihood that any wireless device will receive signals from more than one cell using the same identifier.

For example, on installation, the base station may perform a process in which it receives a pool of identifiers available for use by base stations within the network. As mentioned above, one application of the method is the situation where the base stations 10, 12, 14, 16, 18, 20, 22 are small cell base stations. It is typical for a network operator to reserve a relatively small pool of identifiers for use by small cells, and so, on installation, the small cell is informed of this pool of available identifiers. The pool of identifiers may for example be received from an external management system. Having received information identifying the available identifiers, the base station may then select a temporary identifier allowing it to enter service. Selecting the temporary identifier may comprise checking for identifiers in use by other base stations within a threshold proximity of the base station 10, and allocating as the temporary identifier an identifier which is not in use by any base station within the threshold proximity. The threshold proximity may for example be the detection range of the base station 10 or may be a set radius below which it is possible that base station coverage may overlap.

The base station 10 may then instruct its connected wireless devices, that is User Equipment devices (UEs), to attempt to detect signals transmitted by other base stations, and to report the identifiers that are in use in the signals that they detect. The base station then analyses the received reports of identifiers from among the received pool that are in use by other base stations. The base station 10 may then assign for its subsequent use a final identifier that is selected from the received pool of identifiers, but that is different from the temporary identifier. For example, the final identifier may be selected on the basis that it is not among the selected identifiers being used by neighboring base stations, as reported by the connected wireless devices.

At the start of the process in step 70, the base station 10 has also established a neighbor cell list, which it uses in order to prepare for handovers, as wireless devices move around in the coverage area of the base station. Wireless devices make measurements of the strengths of signals that they receive from other base stations, and report these measurements to the base station 10, together with the respective physical layer identifiers broadcast by those other base stations. Based on these reports, the base station 10 is able to compile a list of neighbor cells that are potential handover targets, because they transmit signals that can be received with an acceptable signal strength by at least some wireless devices that are in the coverage area of the base station 10.

The process shown in FIG. 3 involves entering an observation period at periodic intervals and so, in step 70, it is determined whether a specified time interval has passed since the base station entered service, or since the previous observation period. The specified time interval may for example be within the range from 10 minutes to 24 hours, for example 1 hour. The time interval may be configurable by an operator. The specified time interval is chosen to balance the advantage of obtaining up-to-date information against the disadvantage of performing additional signalling and measurements. The time interval may be adjusted automatically. For example observations may be carried out at shorter intervals in response to received measurements reports that indicate significant changes in the network. Thus, if the measurements reports received from connected UEs indicate that a nearby base station has gone out of service, or that a nearby base station has changed its transmission power by a significant amount, or that a new base station has entered service, new observations may be carried out after a reduced time interval, so that the information that is received reflects the changed network configuration.

If it is determined in step 70 that the specified time interval has not passed, then the step is repeated until the specified time interval has passed, at which point the process passes to step 72, and a new observation period is entered.

In step 72, the base station 10 sends a message to all wireless devices that are in connected mode, that is to say that they are in active radio operation. For example, such a message may be sent to all UEs that are in a call or data session. In this illustrated example of the LTE cellular communications network, the base station is able to request wireless devices that are in connected mode to perform certain operations.

Specifically, in step 72, the base station 10 sends a Radio Resource Control (RRC) Connection Reconfiguration message to wireless devices that are in connected mode, having an active radio connection through that base station. The RRC Connection Reconfiguration message instructs the wireless devices to report all cells that they can detect, and to read and report the EUTRAN Cell Global ID (ECGI) of each such cell. Unlike the physical cell identifier that is broadcast by each base station in its regular transmissions, the ECGI uniquely identifies the cell.

The sending of the RRC Connection Reconfiguration messages, instructing the wireless devices to report the cells that they can detect, and to read and report the EUTRAN Cell Global ID (ECGI) of each such cell, may be achieved by sending a general request to all wireless devices that are in connected mode at the time that the observation period is entered. Alternatively, a message may be sent to each wireless device separately, at a time when it would ordinarily be making measurements in any event. For example, a wireless device may start making measurements relating to the neighboring cells when the strength of signals that it receives from the base station falls below a certain threshold. The base station may send the RRC Connection Reconfiguration message, instructing the wireless device to report the cells that it can detect, and to read and report the EUTRAN Cell Global ID (ECGI) of each such cell, when it receives such measurement reports from the wireless device.

In step 74, the base station receives the reports from the wireless devices. Based on these received reports, the base station is able to identify neighboring cells, transmissions from which can be received by the wireless devices.

In step 76, the base station sends a request to a core network node, for example the Mobility Management Entity (MME) node 26, requesting the IP addresses of each of the neighboring cells identified in the reports from the wireless devices.

In step 78, the base station determines whether the observation period is complete. The duration of the observation period may for example be specified to be within the range from 1 minute to 30 minutes, for example 5 minutes. The specified duration of the observation period may be configurable by an operator. The length of the observation period is chosen to balance the advantage of obtaining the maximum amount of information against the disadvantage of performing additional signalling and measurements. The length of the observation period may be adjusted automatically.

If it is determined in step 78 that the observation period is not yet complete, then the process returns to step 72, and the RRC Connection Reconfiguration message is sent to any wireless devices that have entered connected mode since step 72 was performed previously, or that have started to transmit measurement reports to the base station. In that case, steps 74 and 76 are also repeated.

If it is determined in step 78 that the observation period is complete, then the process passes to step 80. In step 80, the base station determines whether it is necessary for it to reconsider the identifier that it is using.

For example, if one of the connected wireless devices reports that it can detect signals from another base station that is using the same physical cell identifier as the base station to which that wireless device is connected, then it may be necessary for that base station to change its identifier. In that case, the base station preferably waits for a time when it has no active connections to wireless devices, and repeats the process that it used on installation, as described above, for selecting a physical cell identifier.

In step 82, the base station uses the information obtained from the reports received from the wireless devices, in order to modify, if necessary, its neighbor cell list.

The neighbor cell list that is complied by a base station is used in preparing handovers. In general terms, wireless devices that are connected to the base station can be requested to make measurements of the signals received from the cells that are included on the neighbor cell list. If any wireless device finds that it is receiving a stronger signal from one of the neighbor cells than from the serving cell, then a handover from the serving cell to that neighbor cell may be advantageous.

In this case, therefore, the base station seeks to include in its neighbor cell list all of the neighbor cells whose transmissions can be detected by connected wireless devices with a certain signal strength.

Referring to FIG. 1, by way of an example, it can be seen that, if the wireless devices 30, 32, 34, 36 are all connected to the base station 10, then the wireless device 30 may report that it is able to detect signals transmitted by the base stations 14, 16, 18, amongst others, while the wireless device 36 may report that it is able to transmit signals detected by the base stations 18, 20, 22, amongst others. Therefore, the neighbor cell list compiled by the base station 10 should preferably include at least the base stations 14, 16, 18, 20, and 22.

If the base station simply relies on the measurement reports from the wireless devices, which contain the physical cell identifiers broadcast by the other base stations, then there is the possibility that reports will be received from two base stations which share the same identifier, and the base station will be unable to recognize that the received reports related to different base stations. For example, referring back to the example illustrated in FIG. 1, it is quite possible that the base stations 14 and 20 could share a physical cell identity. If the base station 10 simply relies on the measurement reports from the wireless devices 30 and 36, it would be unable to recognize that the respective reports from the wireless devices 30 and 36 related to different base stations. In that case, the neighbor cell list would typically include only one neighbor having that identity, and further reports relating to the same cell identity would be assumed to relate to the same cell. For example, reports from the wireless device 30 relating to the base station 14 might be assumed to relate to the base station 20. An attempted handover could then fail, because the wireless device 30 might be instructed to attempt a handover to the base station 20, when it is in fact unable to detect signals from that base station.

Therefore, the method described herein allows the compilation of a neighbor cell list that includes all of the relevant cells. In step 72, the wireless device 30 would report the ECGIs of the base stations 14, 16, and 18, while the wireless device 36 would report the ECGIs of 18, 20, and 22. In compiling its neighbor cell list, therefore, the base station 10 would be able to separately identify the base stations 14 and 20, even though they share a physical cell identity. Thus, even though there is collision between the physical cell identities used by the base stations 14 and 20, the base station 10 is able to include them both in its neighbor cell list. The result is that, when a user equipment device needs to consider a handover, it is able to make measurements that reflect this situation, and is able to handover to the cell that is able to provide improved coverage.

The base station 10 is therefore able to compile a neighbor cell list that more accurately reflects its wireless environment.

Figure 4:
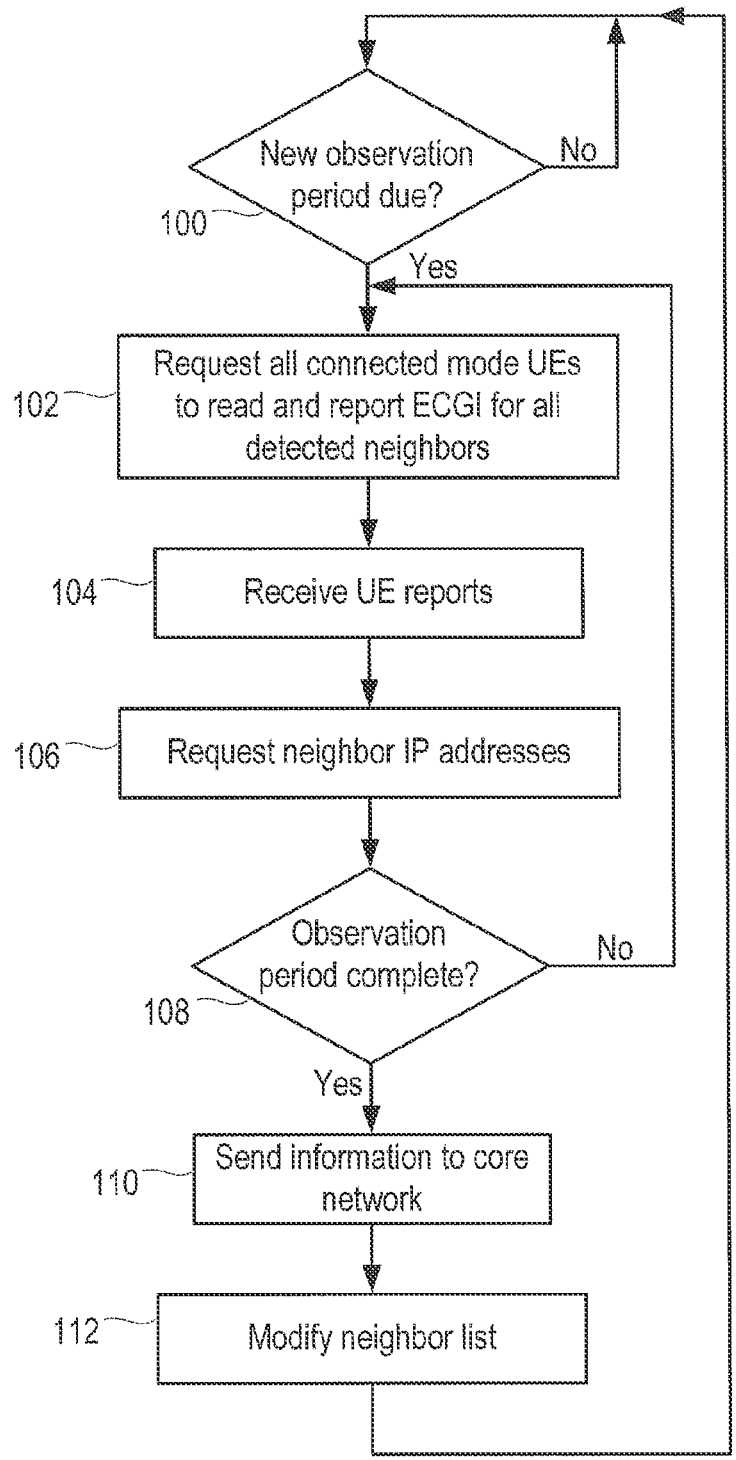
FIG. 4 is a flow chart, illustrating a method in accordance with a second embodiment.

FIG. 4 illustrates a second process performed in the base station 10, in accordance with an embodiment of the disclosure.

It is important to note that the steps shown in FIG. 4 illustrate one example of a process. Some of these steps may be deleted or removed where appropriate, or these steps may be modified or changed considerably without departing from the scope of the present disclosure. In addition, while the operations are described as being sequential, they may be executed concurrently with, or in parallel to, one or more additional operations.

The process shown in FIG. 4 starts at step 100, at a time when the base station 10 is in operation in the cellular communications network. As described with reference to FIG. 3, the base station 10 is operating with a physical layer identifier that it broadcasts with its transmissions. In the illustrative embodiment described here, in which the cellular communications network is an LTE network, the identifier is a Physical Cell Identity (PCI). In the case in which the cellular communications network is a Universal Mobile Telecommunications System (UMTS) network, the identifier may be a Primary Scrambling Code (PSC). In either case, the number of available identifiers is considerably smaller than the number of base stations expected to be present in the network. Therefore, the process of installation of the base station 10 will typically include a process for selecting an identifier that minimizes the likelihood that any wireless device will receive signals from more than one cell using the same identifier.

At the start of the process in step 100, the base station 10 has also established a neighbor cell list, which it uses in order to prepare for handovers, as wireless devices move around in the coverage area of the base station.

The process shown in FIG. 4 involves entering an observation period at periodic intervals and so, in step 100, it is determined whether a specified time interval has passed since the base station entered service, or since the previous observation period. The specified time interval may for example be within the range from 10 minutes to 24 hours, for example 1 hour. The time interval may be configurable by an operator. The specified time interval is chosen to balance the advantage of obtaining up-to-date information against the disadvantage of performing additional signalling and measurements. The time interval may be adjusted automatically, for example observations may be carried out at shorter intervals in response to received measurements reports that indicate significant changes in the network.

If it is determined in step 100 that the specified time interval has not passed, then the step is repeated until the specified time interval has passed, at which point the process passes to step 102, and a new observation period is entered.

In step 102, the base station 10 sends a message to all wireless devices that are in connected mode, that is to say that they are in active radio operation, for example in a call or data session. In this illustrated example of the LTE cellular communications network, the base station is able to request wireless devices that are in connected mode to perform certain operations.

Specifically, in step 102, the base station 10 sends a Radio Resource Control (RRC) Connection Reconfiguration message to all wireless devices that are in connected mode, having an active radio connection through that base station. The RRC Connection Reconfiguration message instructs the wireless devices to report all cells that they can detect, and to read and report the EUTRAN Cell Global ID (ECGI) of each such cell. Unlike the physical cell identifier that is broadcast by each base station in its regular transmissions, the ECGI uniquely identifies the cell.

In step 104, the base station receives the reports from the wireless devices.

In step 106, the base station sends a request to a core network node, for example the Mobility Management Entity (MME) node 26, requesting the IP addresses of each of the neighboring cells identified in the reports from the wireless devices.

In step 108, the base station determines whether the observation period is complete. The duration of the observation period may for example be specified to be within the range from 1 minute to 30 minutes, for example 5 minutes. The specified duration of the observation period may be configurable by an operator. The length of the observation period is chosen to balance the advantage of obtaining the maximum amount of information against the disadvantage of performing additional signalling and measurements. The length of the observation period may be adjusted automatically.

If it is determined in step 108 that the observation period is not yet complete, then the process returns to step 102, and the RRC Connection Reconfiguration message is sent to any wireless devices that have entered connected mode since step 102 was performed previously. In that case, steps 104 and 106 are also repeated.

If it is determined in step 108 that the observation period is complete, then the process passes to step 110. In step 110, the base station determines whether it is necessary to send any information to the core network.

For example, if one of the connected wireless devices reports that it can detect signals from another base station that is using the same physical cell identifier as the base station 10, then it may be necessary for one of the base stations to change its identifier. In that case, the base station 10 may report this occurrence to the core network, for example to the MME node 26 in the core network shown in FIG. 1, so that the core network can take action to resolve this collision, such as by requiring one base station to change its physical layer identifier.

Similarly, if two of the connected wireless devices report that they can detect signals from base stations that are using the same physical cell identifier, but the base station 10 is able to determine that these are two different base stations having different ECGIs, then it may be advantageous for one of the base stations to change its physical layer identifier. Thus, the base station 10 may report this occurrence to the core network, for example to the MME node 26 in the core network shown in FIG. 1, so that the core network can determine whether it is preferable to take action to resolve this collision, such as by requiring one base station to change its physical layer identifier.

In step 112, the base station uses the information obtained from the reports received from the wireless devices, in order to modify, if necessary, its neighbor cell list.

If the base station simply relies on the measurement reports from the wireless devices, which contain the physical cell identifiers broadcast by the other base stations, then there is the possibility that reports will be received from two base stations which share the same identifier, and the base station will be unable to recognize that the received reports related to different base stations.

Therefore, the method described herein allows the compilation of a neighbor cell list that includes all of the relevant cells. In step 102, the connected wireless devices would report the ECGIs of the base stations that they can detect, and so the base station 10 would be able to separately identify the base stations mentioned in the reports, even if they share a physical cell identity. Thus, even though there is collision between the physical cell identities used by the base stations 14 and 20, the base station 10 is able to include them both in its neighbor cell list. The result is that, when a user equipment device needs to consider a handover, it is able to make measurements that reflect this situation, and is able to handover to the cell that is able to provide improved coverage.

The base station 10 is therefore able to compile a neighbor cell list that more accurately reflects its wireless environment.

Numerous other changes, substitutions, variations, alterations, and modifications may be ascertained by one skilled in the art and it is intended that the present disclosure encompass all such changes, substitutions, variations, alterations, and modifications as falling within the scope of the appended claims. Applicant wishes to note that it does not intend, by any statement in the specification, to limit this disclosure in any way that is not otherwise reflected in the appended claims.

What is claimed is:

1. A method of forming a neighbor cell list in a base station of a cellular communications network, the method comprising, at periodic intervals, and for specified durations:

requesting at least one wireless device that is in connected mode with the base station to report a unique identifier for each other base station that it is able to detect;

receiving reports from each wireless device that is in connected mode with the base station;

operating with a neighbor cell list compiled on the basis of the received reports; and reporting instances where one or more of the wireless devices in connected mode reports that it can detect signals from two other base stations that are using a same physical cell identifier as each other, but have different unique identifiers.

2. A method as claimed in claim 1, further comprising:

creating the neighbor cell list on the basis of the received reports.

3. A method as claimed in claim 1, further comprising:

forwarding information from the received reports to a core network node of the cellular communications network; and receiving the neighbor cell list complied on the basis of the received reports from the core network node.

4. A method as claimed in claim 1, wherein the periodic intervals are configurable.

5. A method as claimed in claim 1, wherein the specified durations are configurable.

6. A method as claimed in claim 1, further comprising:

reconsidering an identifier used by the base station itself in response to the received reports, such that the identifier used by the base station is not in use by another base station meeting a proximity condition.

7. A method as claimed in claim 1, further comprising:

reporting to a core network node of the cellular communications network instances where one of the wireless devices in connected mode reports that it can detect signals from another base station that is using a same physical cell identifier as said base station.

8. A method as claimed in claim 1, further comprising reporting to a core network node of the cellular communications network:

instances where one of the wireless devices in connected mode reports that it can detect signals from another base station that is using a same physical cell identifier as said base station; and instances where one or more of the wireless devices in connected mode reports that it can detect signals from two other base stations that are using a same physical cell identifier as each other, but have different unique identifiers.

9. A base station for a cellular communications network, comprising:

a processor; and a memory, said memory containing instructions executable by the processor, wherein said base station is operative to:

at periodic intervals, and for specified durations, request at least one wireless device that is in connected mode with the base station to report a unique identifier for each other base station that it is able to detect;

receive reports from each wireless device that is in connected mode with the base station;

operate with a neighbor cell list compiled on the basis of the received reports; and report instances where one or more of the wireless devices in connected mode reports that it can detect signals from two other base stations that are using a same physical cell identifier as each other, but have different unique identifiers.

10. A base station as claimed in claim 9, wherein the base station is further operative to:

create the neighbor cell list on the basis of the received reports.

11. A base station as claimed in claim 9, wherein the base station is further operative to:

forward information from the received reports to a core network node of the cellular communications network; and receive the neighbor cell list complied on the basis of the received reports from the core network node.

12. A base station as claimed in claim 9, wherein the periodic intervals are configurable.

13. A base station as claimed in claim 9, wherein the specified durations are configurable.

14. A base station as claimed in claim 9, wherein the base station is further operative to:

reconsider an identifier used by the base station itself in response to the received reports, such that the identifier used by the base station is not in use by another base station meeting a proximity condition.

15. A base station as claimed in claim 9, wherein the base station is further operative to:

report to a core network node of the cellular communications network instances where one of the wireless devices in connected mode reports that it can detect signals from another base station that is using a same physical cell identifier as said base station.

16. A base station as claimed in claim 9, wherein the base station is further operative to report to a core network node of the cellular communications network:

instances where one of the wireless devices in connected mode reports that it can detect signals from another base station that is using a same physical cell identifier as said base station; and instances where one or more of the wireless devices in connected mode reports that it can detect signals from two other base stations that are using a same physical cell identifier as each other, but have different unique identifiers.

17. A computer program product, comprising a non-transitory storage medium, containing instructions executable by a processor associated with a base station for a cellular communications network, wherein said base station is operative to:

at periodic intervals, and for specified durations, request at least one wireless device that is in connected mode with the base station to report a unique identifier for each other base station that it is able to detect;

receive reports from each wireless device that is in connected mode with the base station;

operate with a neighbor cell list compiled on the basis of the received reports; and report instances where one or more of the wireless devices in connected mode reports that it can detect signals from two other base stations that are using a same physical cell identifier as each other, but have different unique identifiers.

18. A computer program product as claimed in claim 17, wherein at least one of the periodic intervals and the specified durations is configurable.

19. A computer program product as claimed in claim 17, wherein said base station is further operative to:

create the neighbor cell list on the basis of the received reports.

20. A computer program product as claimed in claim 17, wherein said base station is further operative to:

forward information from the received reports to a core network node of the cellular communications network; and receive the neighbor cell list complied on the basis of the received reports from the core network node.

* * * * *